(12) United States Patent
Topf

(10) Patent No.: US 7,147,449 B2
(45) Date of Patent: Dec. 12, 2006

(54) DEVICE FOR THE PRODUCTION OF AN EXTRUDED PROFILE

(75) Inventor: Siegfried Topf, Traun (AT)

(73) Assignee: Topf Kunststofftechnik Gesellschaft mbH, Kirchdorf (AT)

( * ) Notice: Subject to any disclaimer, the term of this patent is extended or adjusted under 35 U.S.C. 154(b) by 0 days.

(21) Appl. No.: 10/474,197

(22) PCT Filed: Apr. 17, 2002

(86) PCT No.: PCT/EP02/04229

§ 371 (c)(1),
(2), (4) Date: Feb. 4, 2005

(87) PCT Pub. No.: WO02/083396

PCT Pub. Date: Oct. 24, 2002

(65) Prior Publication Data

US 2005/0147703 A1    Jul. 7, 2005

(30) Foreign Application Priority Data

Apr. 18, 2001 (DE) ................... 101 19 066

(51) Int. Cl.
*B29C 47/04* (2006.01)
(52) U.S. Cl. .................. 425/131.1; 425/133.5; 425/462; 425/463

(58) Field of Classification Search ........... 425/131.1, 425/133.5, 462, 463
See application file for complete search history.

(56) References Cited

U.S. PATENT DOCUMENTS

| 3,924,990 A |   | 12/1975 | Schrenk |
| 4,917,851 A | * | 4/1990 | Yamada et al. ............ 264/40.7 |
| 5,078,942 A | * | 1/1992 | Sullivan et al. ......... 264/171.27 |
| 5,269,995 A | * | 12/1993 | Ramanathan et al. ... 264/173.12 |
| 5,620,714 A | * | 4/1997 | Veen ..................... 425/133.1 |

FOREIGN PATENT DOCUMENTS

| DE | 3821902 | 1/1990 |
| EP | 0205157 | 12/1986 |

OTHER PUBLICATIONS

"Short Path Lengths in Coextrusion Feedblock Increase Layer Stability" Modern Plastics International, McGraw-Hill, Inc., vol. 20, No. 7, Jul. 1, 1990, p. 12. (XP000165929).

* cited by examiner

*Primary Examiner*—Joseph S. Del Sole
(74) *Attorney, Agent, or Firm*—Dennison, Schultz & MacDonald

(57) ABSTRACT

A food product comprising a sugar wafer preferably cone-shaped having a filling of a substantially water-free fat-based confectionery material and a process for preparing it which comprises filling the sugar wafer with the substantially water-free fat-based confectionery in a molten, semi-liquid or semi-solid mass, and allowing the filling to harden.

6 Claims, 1 Drawing Sheet

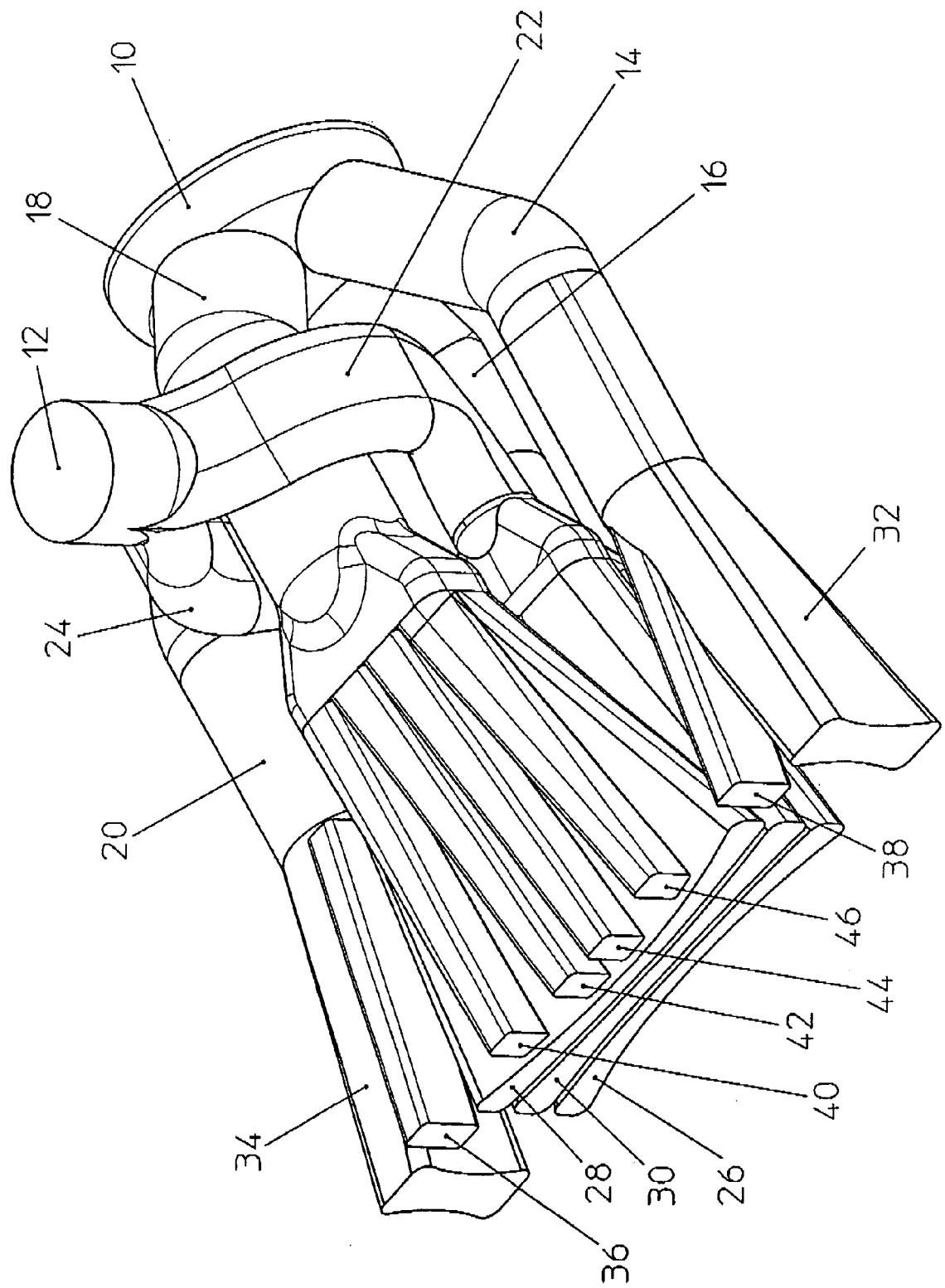

DEVICE FOR THE PRODUCTION OF AN EXTRUDED PROFILE

This application is a 371 of PCT/EP02/04229, filed on Apr. 17, 2002.

BACKGROUND OF THE INVENTION

The invention relates to a device for the production of an extruded profile, by extrusion of differing materials, particularly for the production of an extruded profile with at least three parallel and spaced bars, comprising at least two extruders that release the differing materials as well as flow channels leading to a tool that comprises outlet openings releasing the materials such as slots.

In order to be able to produce semi-finished products or profile consisting of plastic continuously, extrusion processes are used. Here thermoplastic resins in the form of e.g. powder or granules are placed in an extruder, mixed with stabilizers, slip additives and possibly coloring and filling agents and are then conveyed to a profile-determining extrusion tool by means of a screw. During this process the materials are compressed, degassed and homogenized while simultaneously being mixed and kneaded. This creates a homogeneous, flowing mixture, the so-called molding compound, which is heated to or kept at a temperature that is characterized in the lower range by plastification and in the upper range by decomposition of the material. After traveling through an extrusion die specifying the geometry, the material runs through a calibration unit, which consists of a dry-wet calibration combination. Subsequent to that, the material is guided through a full bath vacuum or spray vacuum tank with integrated calibrating cover.

A corresponding device is revealed in DE 197 44 515. Here the flow channels are united directly in front of a die front plate of the tool in order to produce an extruded profile.

From EP 0 299 736 A1 we know of a co-extrusion tool in which also several flow channels run, which are united within the tool in order to produce a multi-layer extruded profile, which exhibits a laminate design.

SUMMARY OF THE INVENTION

It is the object of the present invention to further develop a device of the afore-mentioned kind such that extruded profiles can be extruded, which can consist of differing material in order to be able to process in particular inexpensive, such as recycled, materials. Hereby it shall be ensured that the material that is supposed to be extruded flows to the necessary extent to relatively wide slots that are arranged parallel to one another.

Pursuant to the invention the problem is essentially resolved in that the tool comprises at least three elongated, i.e. one inner and two outer, outlet slots, wherein the outer outlet slots each are connected to a first flow channel, for the supply of a first material, extending from a first junction point, and the inner outlet opening is connected to two second flow channels, for the supply of a second material, between which one of the first flow channels runs and which extend from one joint second junction point. Hereby the inner outlet slot and the outer outlet slots run parallel to each other. The junction points as such are connected to an extruder, respectively.

To be able to produce even complex extruded profiles, one further development of the invention provides that further flow channels extend from the first junction point, which lead to additional preferably slot-shaped outlet openings running in the transverse peripheral region of at least one of the outer elongated outlet openings.

In particular, at least one additional flow channel extends from the first junction point, wherein said channel ends up at another outlet opening that runs in a transverse peripheral region of one of the elongated outlet openings, in particular in a transverse peripheral region of the inner outlet opening.

In a preferred embodiment, at least four flow channels extend from the first junction point, wherein two of said four channels lead into the outer elongated outlet openings and two lead perpendicular to them, of which one, respectively, extends along the transverse peripheral regions of the outer elongated outlet openings.

The outlet openings as such join at a distance from each other into an outlet die of the tool so that the desired geometry of the profile can be achieved. Hereby inner rods, in particular the one extruded with the inner elongated outlet opening, can consist of less expensive resin such as recycled material.

Further details, benefits and features of the invention are revealed not only in the claims, the characteristics disclosed therein—either alone and/or in combination—but also in the following description of an exemplary embodiment shown in the drawing.

To produce profiles by means of extrusion, with said profiles consisting of sections comprising differing materials and relatively elongated bars that run parallel to each other in the range of for example 100 mm, pursuant to the invention a device with a tool is suggested, where the flow channels have the necessary diameter to guarantee material supply to outlet openings such as slots or sheet dies.

BRIEF DESCRIPTION OF THE DRAWING

The FIGURE shows device of the invention in a perspective view.

DETAILED DESCRIPTION OF THE INVENTION

The only FIGURE shows in purely principle form in a diagrammatic view flow channels that run in the tool of an extrusion device, whereby the channels extend from one of a total of two junction points 10, 12, which each are connected to an extruder, via which the flow channels are supplied with the flowing molding compound. In the example, four flow channels 14, 16, 18 and 20 extend from the first junction point 10 and two flow channels 22, 24 from the second junction point 12.

As the basic diagram shows, the tool comprises three elongated outlet slots 26, 28, 30, which run parallel to each other, wherein the outer outlet slots 26, 28, which transition into corresponding outlet dies of the extrusion tool, are connected to the flow channels 16, 18 leading to the first junction point 10 and the inner outlet slot 30 is connected to the second junction point 12 via the flow channels 22, 24.

In order to supply the outlet slot 30 to the necessary extent with flowing homogenized and compressed material, the outlet slot 30 is supplied via the two flow channels 22, 24 by the junction point 12, wherein the flow channels 22, 24 surround in some sections the flow channel 18 that leads to the upper outlet slot 28. In other words, the flow channels 22, 24 extend perpendicularly or substantially perpendicularly in the overlapping area to the flow channel 18.

Due to the fact that the inner outlet slot 30 is connected to two flow channels 22, 24, sufficient molding compound can be supplied regardless of the small diameter of the flow channels 22, 24. In other words, due to the arrangement of the flow channels pursuant to the invention, the outlet slots 26, 28, 30 can be sufficiently supplied with the compressed flowing material.

Furthermore, apart from the flow channels 16, 18 that lead to the outer elongated slotted dies 26, 28, two additional flow channels 14, 20 extend from the first junction point 10, which join into slots 32, 34 that run perpendicular to the outlet slots 26, 28, 30 and along their transverse edges. Moreover additional outlet openings 36, 38 or 40, 42, 44, 46 with a square or rectangular cross-section branch off the flow channels 14, 20 as well as off the flow channel 18 in order to be able to create the desired extruded profile. Hereby outlet openings 40, 42, 44, 46 are arranged along the outer longitudinal side of the upper outlet slot 28, i.e. on the side away from the inner slot 30.

Due to the fact that the flow channels that extend from the second junction point 12 in some areas surround a flow channel 18 that extends from the first junction point 12, sufficient compressed flowing material can flow to the outlet slots 30 with optimal space utilization, whereby the junction points 10, 12 are connected to extruders by means of which the differing materials are plasticized.

The invention claimed is:

1. A device for the production of an extruded profile by co-extruding differing materials, wherein said device comprises first and second elongated outer outlet slots (26, 28) and an elongated inner outlet slot (30) disposed therebetween;

wherein said first outlet slot (26) is connected to a first junction point (10) via a first flow channel (16), and said second outlet slot (28) is connected to said first junction point (10) via a second flow channel (18); and said first junction point (10) is connected to a first extruder that provides a first material;

wherein said inner outlet slot (30) is connected to a second junction point (12) via third and fourth flow channels (22, 24); and said second junction point (12) is connected to a second extruder that provides a second material; and wherein said second flow channel (18) is disposed between said third and fourth flow channels (22, 24).

2. A device according to claim 1, wherein said inner outlet slot (30) and said first and second outlet slots (26, 28) run parallel to each other.

3. A device according to claim 1, further comprising a fourth outlet slot (32) connected to said first junction point (10) via a fifth flow channel (14); and a fifth outlet slot (34) connected to said first junction point (10) via a sixth flow channel (20); wherein the longitudinal axis of said fourth and fifth outlet slots (32, 34) is perpendicular to the longitudinal axis of said first and second outer outlet slots (26, 28).

4. A device according to claim 1, wherein said second flow channel (18) runs perpendicular or substantially perpendicular to said third and fourth flow channels (22, 24) in the region in which said third and fourth flow channels (22, 24) overlap said second flow channel (18).

5. A device according to claim 3, wherein said first, second, fifth, and sixth flow channels (16, 18, 14, 20) extend from said first junction point (10), and wherein two of said flow channels connect to said first and second outer outlet slots (26, 28), and two of said flow channels connect to said fourth and fifth outlet slots (32, 34).

6. A device according to claim 1, further comprising first second, third, and fourth outlet openings (40, 42, 44, 46) connected to said second flow channel (18) and disposed on the outer periphery of said second outer outlet slot (28).

* * * * *